United States Patent [19]
Williams

[11] Patent Number: 6,003,569
[45] Date of Patent: Dec. 21, 1999

[54] PORTABLE AUTOMATED WATER PURIFIER AND METHOD

[75] Inventor: Gordon Williams, Chino, Calif.

[73] Assignee: Gordon L. Williams, Perris, Calif.

[21] Appl. No.: 09/235,465

[22] Filed: Jan. 22, 1999

[51] Int. Cl.[6] ........................................................ B65B 1/04
[52] U.S. Cl. .................................. 141/362; 141/2; 141/18;
141/351; 141/360; 141/95; 141/198; 141/382
[58] Field of Search .................................... 141/2, 18, 94,
141/95, 155, 156, 192, 198, 348, 349, 351,
360, 362, 382; 210/86, 97, 103, 104, 282;
222/1, 189.06

[56] References Cited

U.S. PATENT DOCUMENTS

| | | | |
|---|---|---|---|
| 3,561,506 | 2/1971 | Johnson | 141/348 |
| 5,049,270 | 9/1991 | Carrano et al. | 210/248 |
| 5,587,089 | 12/1996 | Vogel et al. | 210/164 |

Primary Examiner—Steven O. Douglas
Assistant Examiner—Timothy L. Mauret

[57] ABSTRACT

A Portable Automated Water Purifier and Method is disclosed. Also disclosed is a preferred purifier that accepts supply water from a common water spigot and purifies it via a reverse osmosis (or other preferred filtration) process. The purified water is dispensed into a vessel until such time as a non-intrusive level detector indicates that the vessel is fill. The preferred level detector is able to detect the amount of water in the vessel from outside of the vessel, and without the use of a weight scale. The device might detect when the vessel is removed from it's dispensing location, such that the purifier dispensing will be stopped. The preferred purifier includes guides to steady the vessel as it sits in the dispensing location. In another preferred embodiment, a means for filling a beverage preparing device, such as an automatic coffee maker, is included. The alternative purifier is able to selectably dispense into a vessel or into the holding tank of the beverage preparing device, and further includes a timer means for starting the purifier and directing the dispensing into the holding tank.

11 Claims, 6 Drawing Sheets

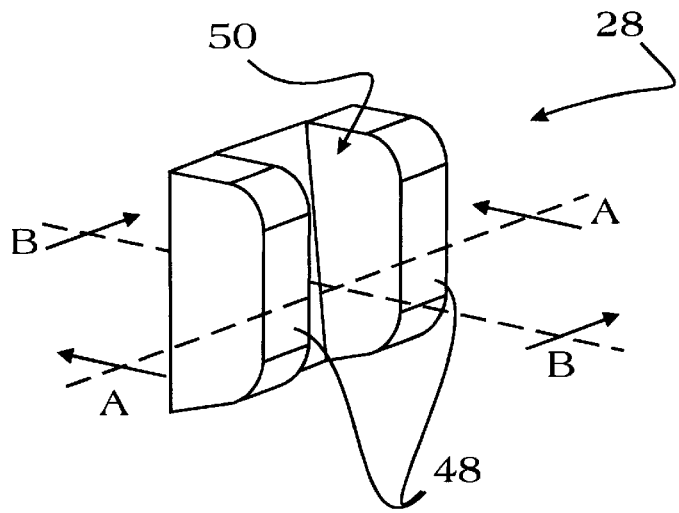
FIGURE 3
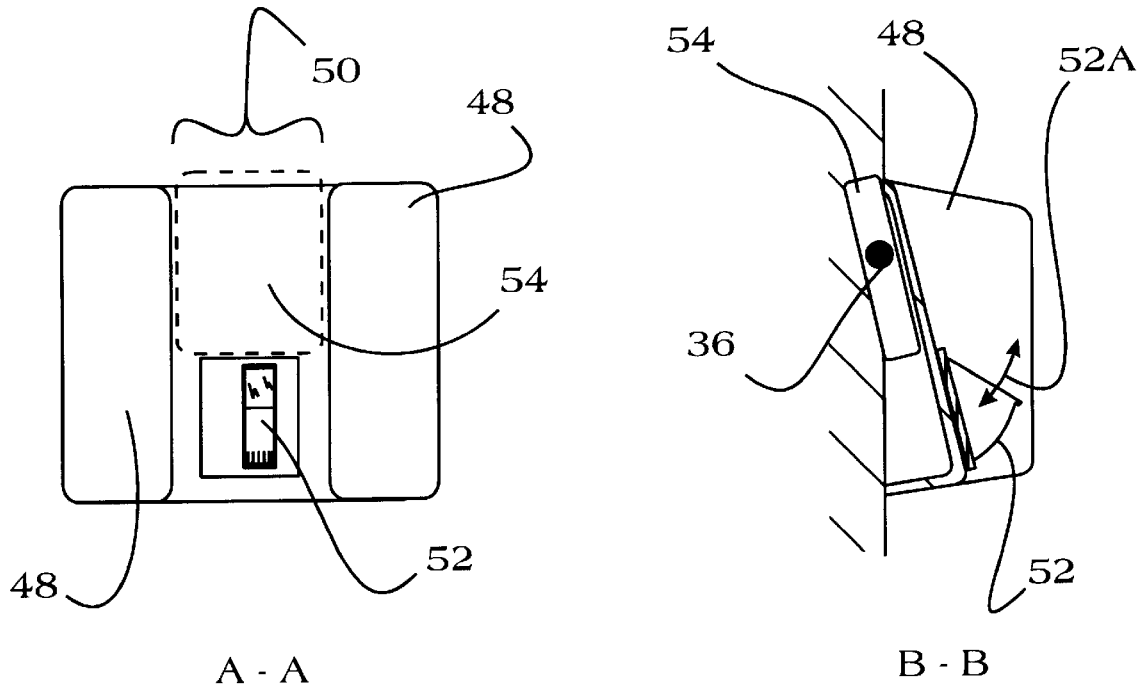
A - A
FIGURE 4
B - B
FIGURE 5

PORTABLE AUTOMATED WATER PURIFIER AND METHOD

BACKGROUND OF THE INVENTION

1. Field of the Invention

This invention relates generally to water purification systems and methods and more specifically, to a Portable Automated Water Purifier and Method.

2. Description of Related Art

The water supply to the average household today comes from a city water supply. Due to a variety of reasons many people have found the city's supplied water to be inadequate for drinking. In response a number of solutions have become available. One solution involves either the delivery or self-service purchase of bottled water. Bottles are available in a variety of sizes from very large, typically designed for the commercial environment, to the small single serving bottles. Both delivered and self-served bottled water do solve the problem of the bad tasting city supplied water. However, bottled water is typically expensive, and requires storage space be allocated for the full and empty bottles. In addition, should the user ever desire to travel, either in a camping scenario, recreational vehicle, or even in a hotel, they must either pack their bottles and take them with them, or hopefully find bottled water at their destination. Another solution to the city water problem involves the installation of a permanent water purification system. These systems are extremely efficient, easy to use, and provide good tasting water for drinking and for ice. The problem with the installed systems is again that they are expensive and also are permanently installed. Since many families are renters of property rather than owners, they may only be in a particular location for a temporary period. The renter therefore would not desire to install a purification system that may or may not be transportable to a future residence. As such, the renter is relegated to using the bottled water discussed above.

What is needed therefore is a system, like the installed water purification systems, that can take ordinary tap water supplied by the city and purify it to a point suitable for drinking. The preferred system will have the added benefit of being portable, which would enable the user to make a temporary installation of the system wherever they chose, and then removing it and taking it with them when they decide to leave. An added benefit might include the ability to operate the water purifier with a coffee or other automated beverage maker, such that the portable purifier would supply water directly to the coffee or other beverage maker without the need for additional manual steps of filling the pitcher and then transferring the water to the coffee maker.

SUMMARY OF THE INVENTION

In light of the aforementioned problems associated with the prior methods and devices, it is an object of the present invention to provide a Portable Automated Water Purifier and Method. It is an object that the preferred purifier accept supply water from a common water spigot and purify it via a reverse osmosis (or other preferred filtration) process. The purified water will preferably be dispensed into a vessel until such time as a non-intrusive level detector indicates that the vessel is full. It is a further object that the preferred level detector be able to detect the amount of water in the vessel from outside of the vessel, and without the use of a weight scale. It is a still further object that the device detect when the vessel is removed from it's dispensing location, such that the purifier dispensing will be stopped. The preferred purifier should further include guides to steady the vessel as it sits in the dispensing location. It is a still further object to provide another embodiment that includes a means for filling a beverage preparing device, such as an automatic coffee maker. The alternative purifier should be able to selectably dispense into a vessel or into the holding tank of the beverage preparing device, and should further include a timer means for starting the purifier and directing the dispensing into the holding tank.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIG. 3 is a perspective view of the automatic switch assembly of the present invention;

FIG. 4 is a front view of the automatic switch assembly of FIG. 3;

FIG. 5 is a partial cutaway side view of the switch assembly of FIGS. 3 and 4;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Portable Automated Water Purifier and Method.

Figure 1:
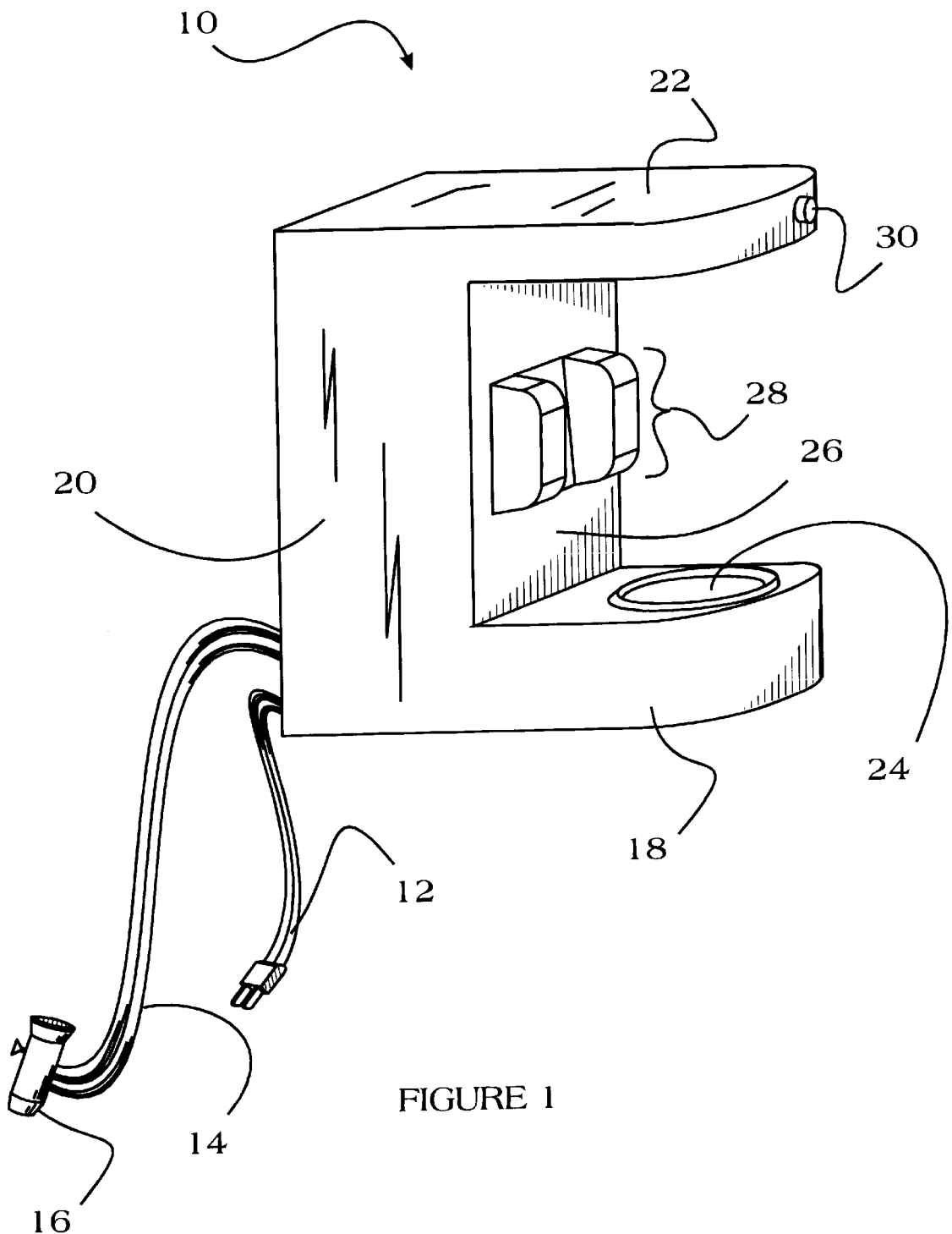
FIG. 1 is a perspective view of a preferred embodiment of the portable automated water purifier of the present invention.

The present invention can best be understood by initial consideration of FIG. 1. FIG. 1 is a prospective view of a preferred embodiment of the portable automated water purifier 10 of the present invention. The water purifier 10 is configured to preferably sit on a counter top and attach to an existing power source via the power cable 12, and attach to an existing faucet via the supply and return water hoses 14 and the faucet adapter means 16. It should be understood that the power supply might very well be internal to the water purifier 10 such as a battery, depending upon the particular size and application of the unit. In its preferred form the water purifier 10 comprises a base 18, a stand 20 and a dispenser assembly 22. On the base is preferably formed a vessel rest 24 such as the upraised ring shown here. On the face 26 of the stand 20 there may be formed an automatic switch assembly 28. The automatic switch assembly 28 provides unique functionality to the present invention. The automatic switch assembly 28 is a system and device that does at least two things: (1) it detects the insertion and removal of the vessel, and (2) it non-intrusively detects the water level in the vessel. Furthermore, the automatic switch assembly 28 may provide means for steadying the vessel when it sits on the vessel rest 24. On the bottom side of the dispenser assembly 22 (not shown), there is found a dispensing nozzle for dispensing water purified by the water purifier 10 into a vessel. On the front of the dispenser assembly 22, there is preferably found a manual switch means 30 for manually activating and deactivating the purification of water. In this preferred embodiment the manual switch means 30 further includes an internal light source for indicating to the user when the device 10 is in purification mode, or when it is shut down. Furthermore, the manual switch means 30 may indicate other status conditions pertinent to the operation of the water purifier system 10.

Figure 2:
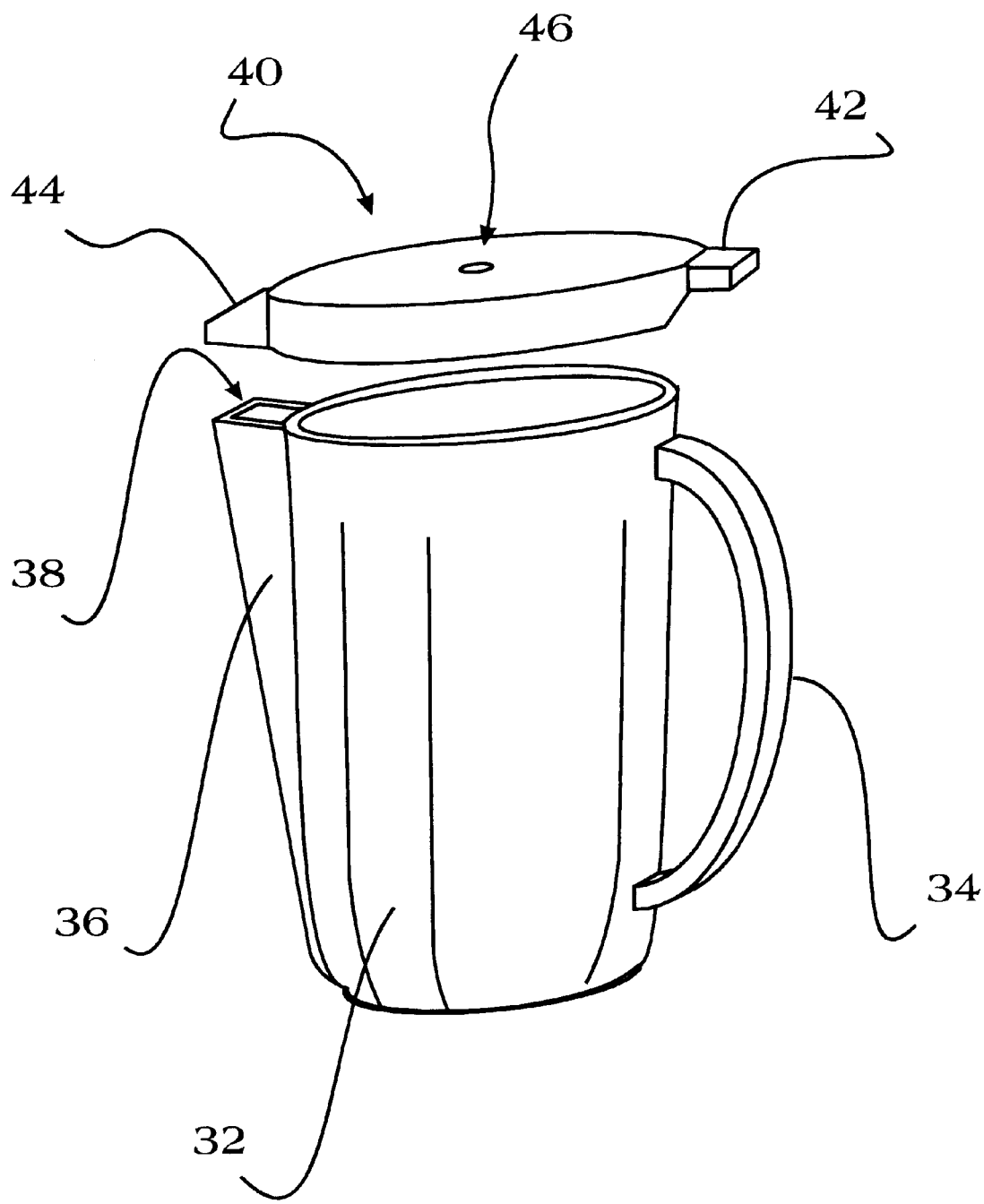
FIG. 2 is a perspective view of a preferred vessel for capturing water dispensed by the device of FIG. 1.

Now turning to FIG. 2, we can see the preferred vessel 32 for use with the automated water purifier 10 previously discussed in connection with FIG. 1. FIG. 2 is a perspective view of a preferred vessel 32 for capturing water dispensed by the device of FIG. 1. The vessel 32 comprises, in its preferred form, a handle 34 and a pour channel 36. The pour channel 36 is simply a channel running from the bottom of the vessel 32 to a spout 38 formed at the upper edge of the channel 36. Other preferred vessel 32 designs may include a variety of configurations, including a vessel 32 having 2 or 3 pour channels arranged in spaced relation around the circumference of the vessel 32.

The preferred vessel 32 may include a lid 40 configured to cooperate with the vessel 32. The unique lid 40 comprises a button portion 42 and a spout portion 44. The button portion 42 is, essentially, a protrusion from the main portion of the lid 40 extending over the handle 34 such that when the button portion 42 is depressed, such as by the user's thumb, the lid 40 will cantilever upward. The spout portion 44 on the lid 40 is simply an extension of the main lid 40 formed to securely cover the spout 38. Finally, in the center of the lid 40 is formed an aperture 46 through which water is dispensed into the vessel by the portable automated water purifier 10 of FIG. 1. The preferred material construction for the vessel 32 and lid 40 are plastic, however, other materials might be used, such as ceramics, glass, crystal and other materials known in the arts.

Now turning to FIG. 3, we can gain a better understanding of the automatic switch assembly 28 of the present invention. FIG. 3 is a perspective view of the automatic switch assembly 28 of the present invention. As discussed previously in connection with FIG. 1, the automatic switch assembly 28 preferably performs three functions: first, it restrains the vessel 32 from being jarred loose from the water purifier 10, second, it detects when the vessel 28 is placed on the purifier 10 and when it is removed from the purifier 10, and finally, and most uniquely, it detects the water level within the vessel 28 without intruding into the vessel itself. In its preferred form, the automatic switch assembly 28 comprises a pair of guides 48 formed on either side of the groove 50. The grove 50 and guides 48 are formed cooperatively with the pour channel 36 formed in the vessel 32 (see FIG. 2).

Now turning to FIG. 4 we can further examine the unique automatic switch assembly 28 of the present invention. FIG. 4 is a front view of the automatic switch assembly 28 of FIG. 3 depicting the guides 48 formed on either side of the groove 50. In the groove 50 are located a vessel removal detector means 52 and a vessel level sensing means 54. The vessel removal detector means 52 may preferably be a spring-loaded switch configured to be depressed when the pour channel 36 is slid between the guides 48. Consequently, when the pour channel 36 (and the vessel 32) are removed from the purifier 10 the vessel removal detector means 52 (in this case a spring-loaded switch) will return to its normal position, thereby indicating that the vessel has been removed and consequently shutting down purifier operation. The vessel level sensing means 54 (shown here in dashed lines) comprises preferably a proximity switch. A conventional proximity switch will detect a change in density in the immediate vicinity of the sensor. In this case the preferred vessel level sensing means 54 will sense the associated change in density that indicates that liquid is now in close proximity to the vessel level sensing means 54. This condition is caused when the water level in the vessel 32 rises to a specified point along the automatic switch assembly 28.

Figure 6:
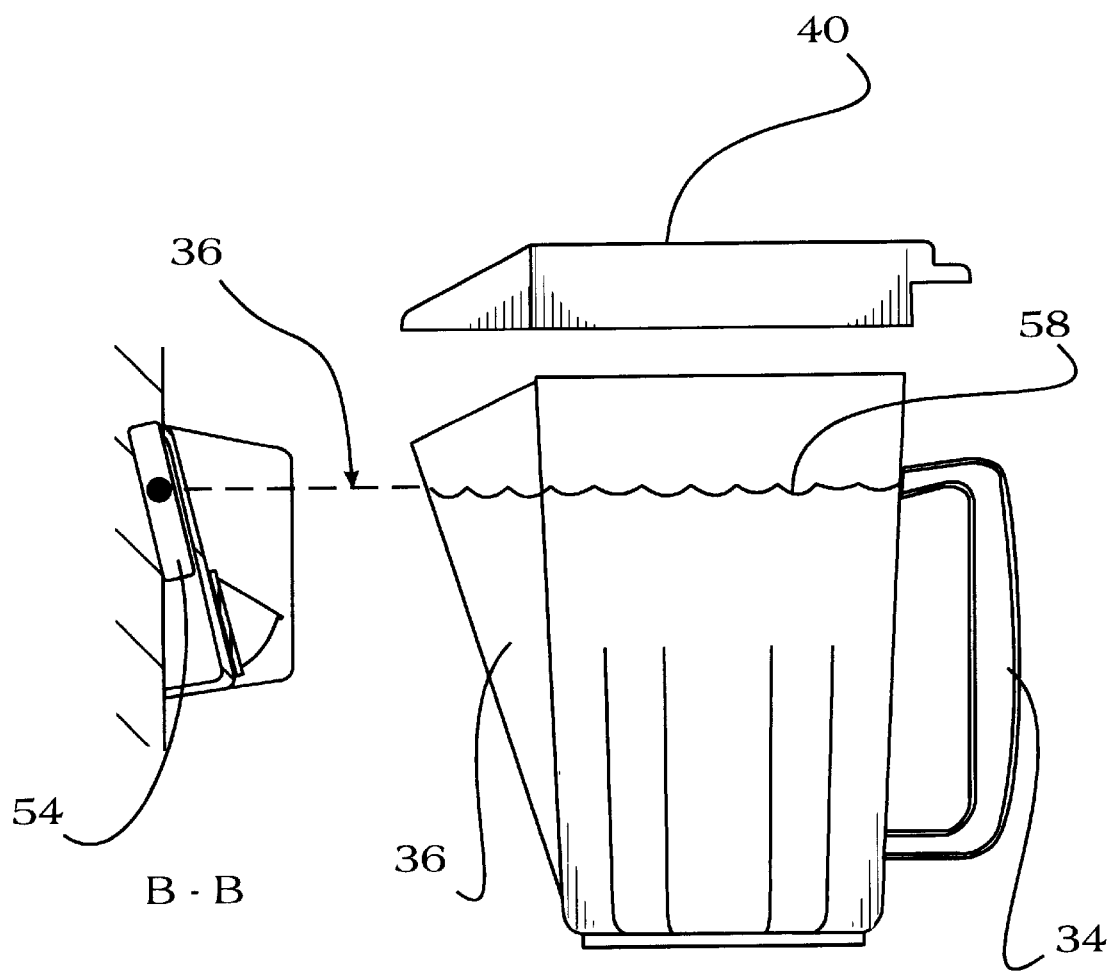
FIG. 6 is a side view of the switch assembly of FIG. 5 and the vessel of FIG. 2.

Now turning to FIGS. 5 and 6, we can further discuss the automatic switch assembly 28 of the present invention. FIG. 5 is a partial cutaway side view of the switch assembly 28 of FIGS. 3 and 4. FIG. 6 is a side view of the switch assembly 28 of FIG. 5 and the vessel 32 of FIG. 2. The vessel removal detector means 52 is a switch that travels in the direction of arrow 52a to indicate the presence or absence of the vessel 32. The vessel level sensing means 54 is configured and/or programmed to detect a level setpoint 56 at a particular height along the automatic switch assembly 28. It should be understood that the level setpoint 56 is preferably adjustable either manually or through electrical or electronic adjustments, or even automatically, such that it can be commanded to detect a level higher or lower than the level in a standard vessel 32. For instance, if a special container is inserted into the purifier 10, such as one that is shorter than the original vessel 32, the user would desire to lower the level setpoint 56. The unique feature of the vessel level sensing means 54 permits the user to do so without requiring major modifications to the unit. The level setpoint 56 can therefore be set to detect the water level 58 at virtually any location above the vessel rest 24 (see FIG. 1).

Now turning to FIG. 6 we can discuss the unique process performed by the purifier of the present invention. FIG. 6 is a process flow chart for the automatic water purifier for the preferred automatic water purifier 10 of the present invention as described previously in connection with FIG. 1. Beginning with faucet water, the water first passes the faucet adapter means 16 in step 618. Next, in step 620 water passes through the supply hose 14 until reaching a pump means to increase pressure in step 622. The pressure increase step 622 comprises a system for elevating the pressure of the inlet water to preferably 60 PSIG (depending upon the supply water pressure, some pressure increase may be necessary in order to insure proper purification). Step 622 comprises preferably a pump means 60 and pressure detector 62. Should the pressure detector 62 detect a water pressure below preferably 60 PSIG, it will command the pump means 60 to increase the supply of water pressure until it reaches at least 60 PSIG. The pump means 60 preferably receives power from the power control means 64. After leaving step 622, at a pressure of at least 60 PSIG, step 624 is performed in which a sediment filter 64 removes gross sediment entrained within the water. Next, step 626 is performed, in which a pre-carbon filter preferably removes any taste that might exist in the water. Next step 628 is conducted, wherein the water passes through a reverse osmosis membrane 68. The reverse osmosis membrane 68 is the conventional sort used in the industry, that preferably can handle between 35 and 70 gallons per day. Next, the water passes through a post carbon filter in step 630, where the post carbon filter 70 removes any taste attributable to the RO membrane. Next step 632, involves the water passing through an automatic shut off valve 72 controlled by the power control means 64. If the valve 72 is open, the dispenser assembly 22 (see FIG. 1) will dispense water into the vessel 32 until such time as the water level 58 reaches the level setpoint 56, whereafter the valve 72 is commanded to close (see FIG. 5). The preferred power control means 64 comprises a power supply 74 which might be a power cable 12 described above in connection with FIG. 1, or it might be an internal power supply such as a conventional battery. Next, the manual switch means 30 is used to manually turn on and off the purifier 10. Assuming that the switch means 30 is closed, next, step 636 is accomplished by the vessel removal detector means 52. If the vessel removal detector means 52 indicates that the vessel is in position to receive water, than the detector means 52 indicates closed condition, allowing power to reach the level sensing means 54. Next, in step 638, the level sensing means 54 remains closed until the level sensing means 54 detects that the water level 58 has hit the level setpoint 56, at which time the level sensing means 54 will open, thereby commanding the valve 72 to close, and cease dispensing of water into the vessel 32.

Figure 7:
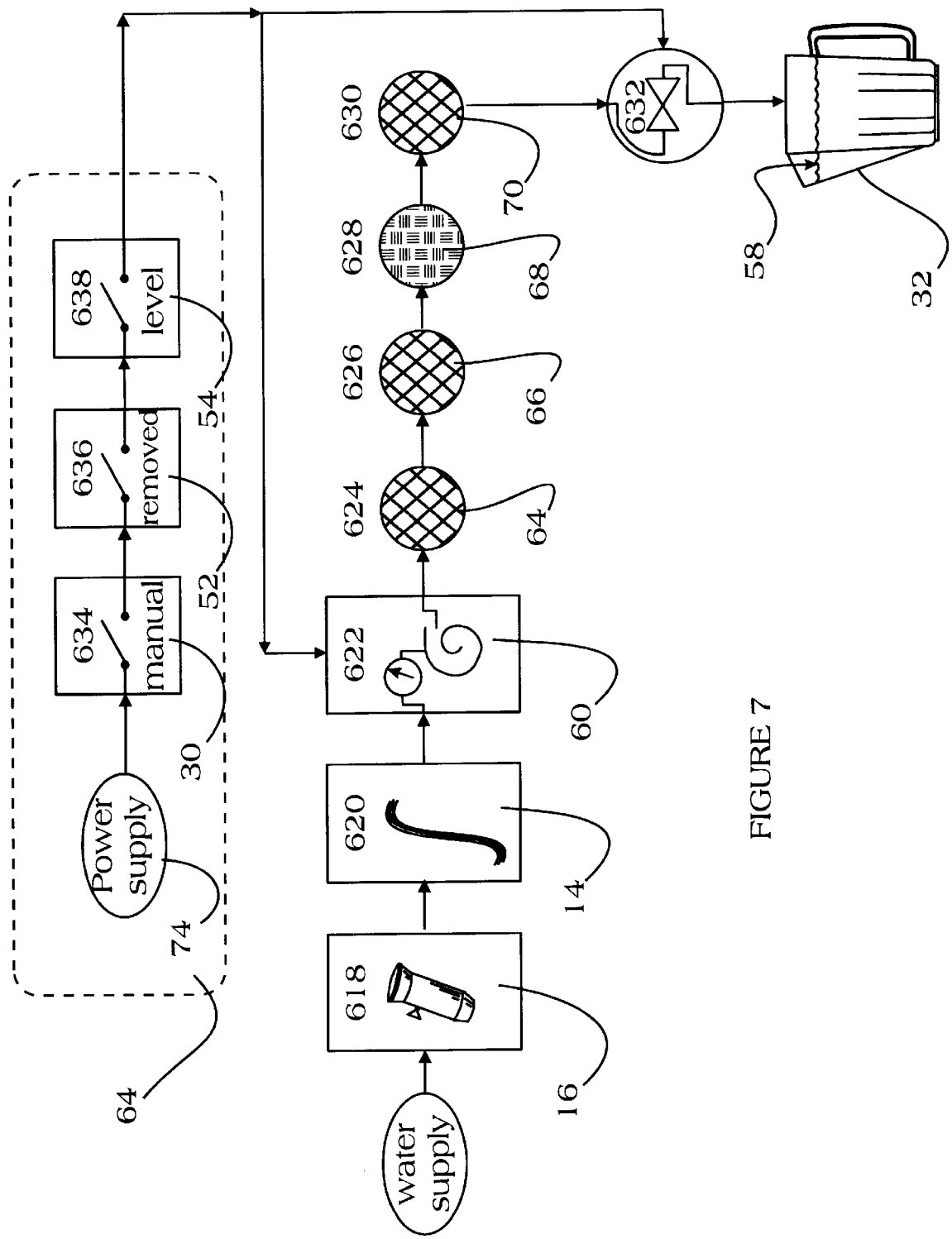
FIG. 7 is a process flow chart for the automatic water purifier for the preferred automatic water purifier of the present invention.
Figure 8:
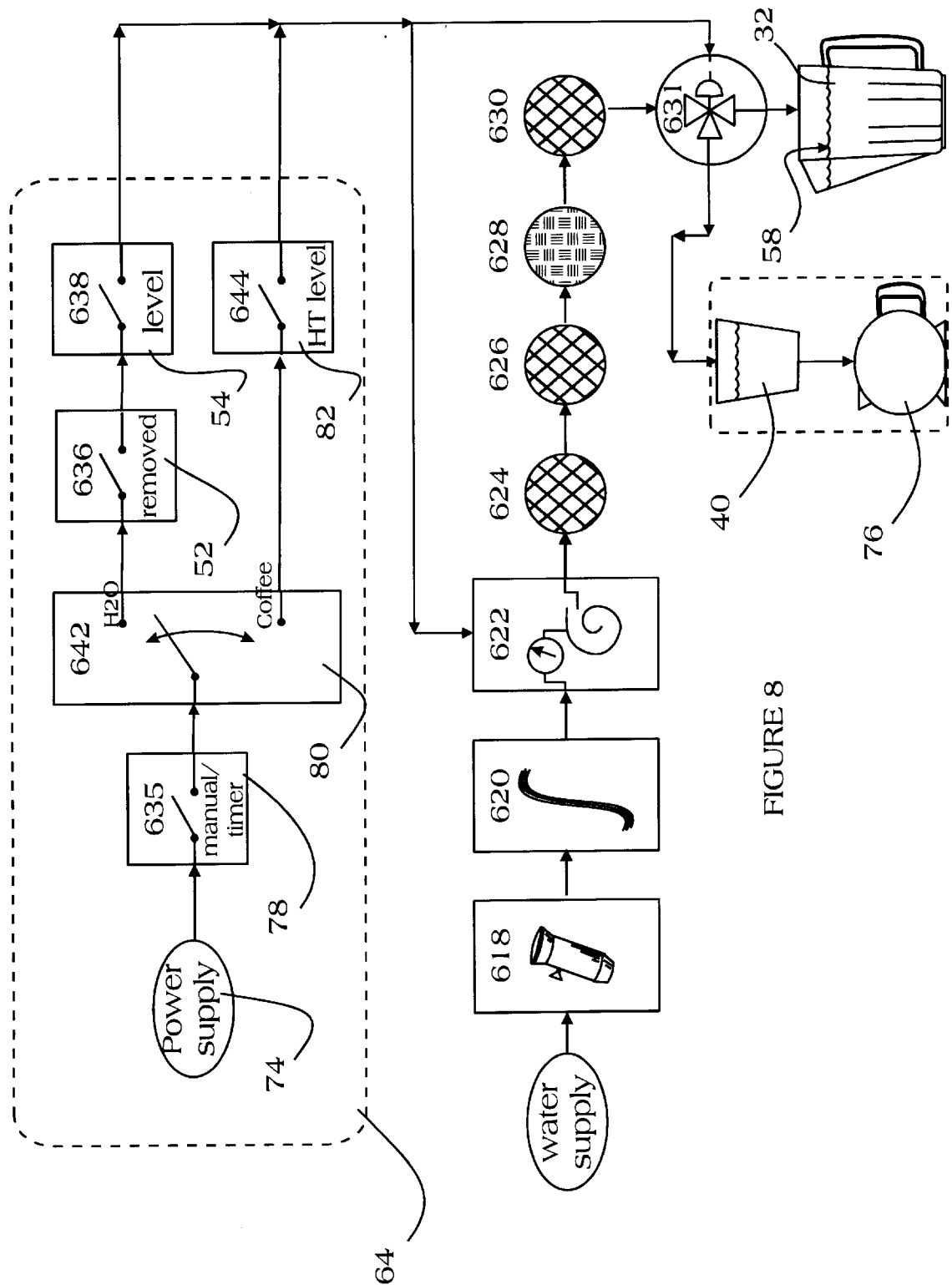
FIG. 8 is a process flow chart of an alternative embodiment of the present invention, including a conventional coffee maker attachment.

FIG. 7 is a process flow control diagram for another preferred embodiment of the present invention that includes a coffee maker 76 (or other automated beverage making apparatus), that is operatively connected to the automated water purifier 10 of the present invention. Similar to the diagram and process of FIG. 6, FIG. 7 includes connection to the tap step 618, transfer to the system via the water hoses, step 620, elevating the inlet pressure if necessary, step 622, and then conducting the filtration and purification steps 624, 626, 628, and 630. The difference in the alternative embodiment 11 arises in the power control means 65. The power from power supply 74 now goes to step 635, which comprises a manual and/or timer based on and off switch 78, that may direct the purifier 11 to begin the purification process at a prescheduled time. The switch 78 may also permit manual starting of the purification process. Next, step 642 is commenced in which a selector switch means 80 determines whether the purified water is used for drinking or used for the making of a hot beverage. If the selector means 80 is set for purified water, the process will conclude in an identical manner described in FIG. 6. If, however, the selector means 80 is set for coffee (or other beverage as appropriate), step 644 will be conducted, which comprises a holding tank level sensing means 82 detecting whether the holding tank 83 level (presumably within the coffee maker 76) is below the desired setpoint. While the holding tank level sensing means 82 detects that the level in holding tank 83 is below its setpoint, the sensing means 82 will remain closed, which intern will direct the three way valve 84 to direct water to be filled into the holding tank 83. Once the level in the holding tank 83 reaches the appropriate level, as sensed by the holding tank level sensing means 82, the sensing means 82 will open, which will cause the three way valve 84 to close. It should be understood that the coffee maker 76 may be integrated into the water purification means 11, or it may be a stand-alone apparatus that simply sends a tank level indication for use by the tank level sensing means 82. Furthermore, it should be appreciated that the tank level sensing means 82 might be the same sensor as the level sensor 54 discussed above. In other words, a single programmable level sensor may conduct the level sensing for the purifier vessel as well as for the coffee maker holding tank.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A portable water purifier for accepting supply water from a water spigot, said portable water purifier comprising:

A housing having purification means for purifying water held within said housing;

a water supply means adapted to be detachably attached to said water spigot for transmitting water from said water spigot to said purification means for purification;

a vessel removably associated with said housing and defined by a pour channel, an exterior, and an interior volume for holding a fluid, wherein said purification means comprises dispensing means for dispensing purified water into said vessel;

said purification means further comprises vessel level sensing means on an exterior for detecting the water level in said vessel, and vessel removal detector means for detecting when said vessel has been removed or re-associated with said housing;

said vessel level sensing means and said vessel removal detector means comprise an automatic switch assembly, and said dispensing means is responsive to said automatic switch assembly;

wherein said purification means further comprises valve means responsive to said automatic switch assembly for controlling the flow of purified water therefrom; and said vessel removal detector means cooperates with said pour channel.

2. The purifier of claim 1, wherein said housing further comprises a pair of guides, said guides cooperating with said pour channel to steady said vessel as said vessel rests on said housing.

3. The purifier of claim 2, wherein said purification means further comprises pressure increase means for increasing water pressure before said purification means purifies the water.

4. The purifier of claim 1, wherein said purification means is configured to cooperate with a beverage preparing device, whereby said dispensing means further comprises means for dispensing water into said beverage preparing device.

5. The purifier of claim 4, wherein said purification means further comprises selector switch means for selectively dispensing water into said vessel or into said beverage preparing device.

6. The purifier of claim 5, wherein said beverage preparing device is further defined by an internal holding tank, and further comprising holding tank level sensing means for detecting the water level in said internal holding tank.

7. The purifier of claim 6, wherein said holding tank level sensing means and said vessel level sensing means comprise a single device.

8. A method for purifying supply water from a spigot, comprising the steps of:

Detachably attaching a water supply means to the spigot;

transmitting water through said water supply means to an attached purification means;

purifying said incoming water in said purification means, and dispensing said purified water into a vessel;

wherein said vessel is removably associated with said housing and is defined by a pour channel, an exterior, and an interior volume for holding a fluid;

wherein said purifying step is further responsive to vessel level sensing means on said exterior for detecting the water level in said vessel, and vessel removal detector means for detecting when said vessel has been removed or re-associated with said housing;

said vessel level sensing means and said vessel removal detector means step is accomplished exclusively by proximity switches, and said vessel removal detector means cooperates with said pour channel; and wherein, upon removal or re-association of said vessel with said housing, valve means controls the flow of water from said purification means via said proximity switches.

9. The method of claim 8, wherein said purifying step further comprises a pressure increase step, wherein pressure increase means for increasing water pressure before said purification means purifies the water, increases the pressure.

10. The method of claim 9, wherein said purifying step further comprises purification means configured to cooperate with a beverage preparing device, whereby said dispensing step further comprises means for dispensing water into said beverage preparing device.

11. The method of claim 10, wherein said purifying step further comprises said purification means further comprising selector switch means for selectively dispensing water into said vessel or into said beverage preparing device.

\* \* \* \* \*